(12) United States Patent
Zedlitz et al.

(10) Patent No.: US 8,886,675 B2
(45) Date of Patent: Nov. 11, 2014

(54) METHOD AND SYSTEM FOR MANAGING DATA CLUSTERS

(75) Inventors: Albert Zedlitz, Wiesloch (DE); Stefan Schulz, Berlin (DE)

(73) Assignee: SAP SE, Walldorf (DE)

( * ) Notice: Subject to any disclaimer, the term of this patent is extended or adjusted under 35 U.S.C. 154(b) by 1568 days.

(21) Appl. No.: 12/256,482

(22) Filed: Oct. 23, 2008

(65) Prior Publication Data

US 2009/0187589 A1 Jul. 23, 2009

Related U.S. Application Data

(60) Provisional application No. 61/022,818, filed on Jan. 23, 2008.

(51) Int. Cl.
*G06F 17/30* (2006.01)
*G06F 12/02* (2006.01)

(52) U.S. Cl.
CPC .................................. *G06F 12/0269* (2013.01)
USPC .......................................... 707/786; 707/797

(58) Field of Classification Search
USPC ......... 707/704, 791, 800, 801, 813, 809, 634, 707/693
See application file for complete search history.

(56) References Cited

U.S. PATENT DOCUMENTS

| | | | |
|---|---|---|---|
| 5,222,217 A * | 6/1993 | Blount et al. ........................ 1/1 |
| 6,279,148 B1 * | 8/2001 | Taivalsaari et al. ........... 717/114 |
| 6,941,410 B1 * | 9/2005 | Traversat et al. ................. 711/6 |
| 7,451,168 B1 * | 11/2008 | Patterson ............... 707/999.202 |
| 2004/0168030 A1 * | 8/2004 | Traversat et al. ............. 711/133 |
| 2004/0225922 A1 * | 11/2004 | Susarla et al. ................... 714/38 |
| 2006/0259744 A1 * | 11/2006 | Matthes ........................ 712/220 |
| 2007/0006178 A1 * | 1/2007 | Tan ................................ 717/136 |
| 2007/0136221 A1 * | 6/2007 | Sweeney et al. ................. 706/20 |

OTHER PUBLICATIONS

Williams et al., Dynamic Grouping in an Object-Oriented Virtual Memory Hierarchy. ECOOP' 87 European Conference on Object-Oriented Programming Lecture Notes in Computer Science vol. 276, 1987, pp. 79-88. http://link.springer.com/chapter/10.1007%2F3-540-47891-4_8.*

Danny Heap, Depth-first search (DFS). 2002. https://web.archive.org/web/20021101090003/http://www.cs.toronto.edu/~heap/270F02/node36.html.*

* cited by examiner

*Primary Examiner* — Syed Hasan

(57) ABSTRACT

A method and system for managing data clusters is provided. A first data cluster is generated having a first data object and a second data object. The first data cluster has a strict hierarchy between the first data object and the second data object. A first object reference from the first data object to the second data object is extracted. The first object reference is stored in a first reference container. A second object reference from the first data object to a third data object is extracted. The third data object is stored in a second data cluster. The second object reference is stored in a second reference container. The second object reference is stored in a second reference container. A memory access is provided to the first data cluster based on the first object reference and the second object reference.

18 Claims, 5 Drawing Sheets

METHOD AND SYSTEM FOR MANAGING DATA CLUSTERS

This application claims the benefit of and priority to U.S. Provisional Patent Application No. U.S. 61/022,818, filed Jan. 23, 2008, titled "METHOD AND SYSTEM FOR MANAGING DATA CLUSTERS," which is incorporated herein by reference in its entirety.

TECHNICAL FIELD

Embodiments of the invention generally relate to computer systems, and more particularly to a method and system for managing data clusters.

BACKGROUND

In computer science, memory management is the act of managing computer memory. In its simpler forms, this involves providing ways to allocate portions of memory to programs at their request, and freeing it for reuse when no longer needed. Virtual memory systems separate the memory addresses used by a process from actual physical addresses, allowing separation of processes and increasing the effectively available amount of real memory (e.g. Random Access Memory) using disk swapping. The quality of the virtual memory manager can have a big impact on the overall system performance. Virtual memory is a computer system technique which gives an application program the impression that it has contiguous working memory, while in fact it is physically fragmented and may even overflow on to disk storage. Systems which use this technique make programming of large applications easier and use real physical memory more efficiently than those without virtual memory. Almost all implementations of virtual memory divide the virtual address space of an application program into pages. A page is a block of contiguous virtual memory addresses. Pages are usually fixed in size (at least 2K bytes). Systems with large virtual address ranges or large amounts of real memory generally use larger page sizes Paging is the process of saving inactive virtual memory pages to disk and restoring them to the real memory when required. This is referred to as disk swapping. Most virtual memory systems enable programs to use virtual address ranges which in total exceed the amount of the real memory. To do this they use disk files to save virtual memory pages which are not currently active, and restore them to the real memory when they are needed. Applications are only aware of virtual addresses. Dynamic address translation is typically done by a memory management unit which looks up in an appropriate page table the real address corresponding to a virtual address and passes the real address to parts of the CPU (Central Processing Unit) which execute instructions. If the page tables indicate that the virtual memory page is not currently in real memory, the hardware raises a page fault. The appropriate page is then loaded on to the real memory for use by the CPU.

In object oriented languages, data objects are typically spread over multiple pages and object references frequently exist between data objects. An object reference to an object which is part of a page that is not currently in the real memory results in a page fault. Loading up a page in the real memory from the disk memory consumes system resources. Furthermore, if the real memory does not have enough space to accommodate a new page, an inactive page must be identified and removed from the real memory to make space for the new page. Thus, a large number of page faults result in the consumption of a considerable amount of system resources and affects the overall system performance.

In typical scenarios where several users initiate transactions simultaneously on a same set of data, a portion of the data changed by one of the users may affect other users. Systems generally deal with such problems by allowing only one user to access the set of data while locking write access to the set of data to all other users. The objects stored in a page typically do not have a strict hierarchy and have multiple loops of object references. An example of a loop is an object A referring an object B, the object B referring an object C and the object C referring the object A. The absence of a strict object hierarchy, the presence of loops of object references and related objects spread over multiple pages makes locking of data very difficult and resource hungry.

In computer systems, garbage collection is the process of automatically freeing objects that are no longer referenced by the program. Garbage collection is typically accomplished by identifying the objects that are no longer referenced and clearing the unreferenced objects to make space for new objects. In case of hardware implemented garbage collectors, it is very difficult to determine whether a content of a memory location is an address to another memory location (a reference) or just an integer. Thus hardware implemented garbage collection is very difficult in current systems.

SUMMARY OF THE INVENTION

Embodiments of the invention are generally directed to a method and system for managing data clusters. A first data cluster is generated having a first data object and a second data object. The first data cluster has a strict hierarchy between the first data object and the second data object. A first object reference from the first data object to the second data object is extracted. The first object reference is stored in a first reference container. A second object reference from the first data object to a third data object is extracted. The third data object is stored in a second data cluster. The second object reference is stored in a second reference container. A memory access is provided to the first data cluster based on the first object reference and the second object reference.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for managing data clusters. A first data cluster is generated having a first data object and a second data object. The first data cluster has a strict hierarchy between the first data object and the second data object. A first object reference from the first data object to the second data object is extracted. The first object reference is stored in a first reference container. A second object reference from the first data object to a third data object is extracted. The third data object is stored in a second data cluster. The second object reference is stored in a second reference container. The second object reference is stored in a second reference container. A memory access is provided to the first data cluster based on the first object reference and the second object reference.

Figure 1:
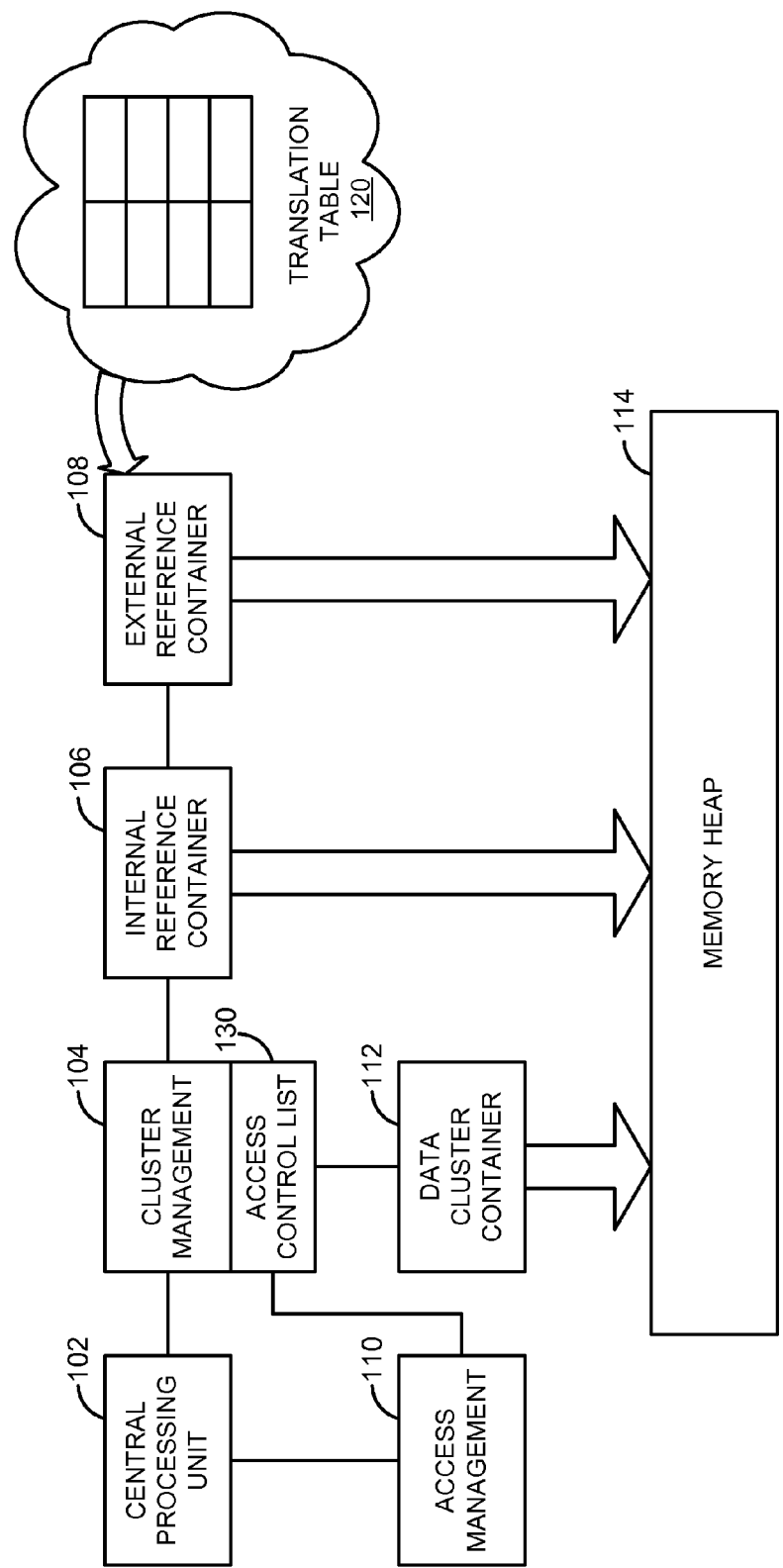
FIG. 1 is a functional block diagram of a system for managing data clusters according to an embodiment of the invention.

FIG. 1 is a functional block diagram of a system for managing data clusters according to an embodiment of the invention. Cluster management 104 is typically responsible for generating and managing one or more data clusters and storing the data clusters in data cluster container 112. Each of the data clusters generally includes one or more data objects logically related to each other. The data objects with object references to each other are generally stored in a single data cluster. The data objects in each of the data clusters typically maintain a strict hierarchy without any loops of object references between data objects. A node in the strict hierarchy typically includes one data object. A data size of the data clusters may typically be changed dynamically by cluster management 104 based on the number of data objects logically related to each other. Internal reference container 106 generally stores internal object references between data objects that are stored in one data cluster. Object references may exist between objects that are stored in separate data clusters. Such object references are stored as external object references in external reference container 108. In an embodiment, cluster management 104 is responsible for extracting internal object references and external object references from the data clusters and storing the internal object references in internal reference container 106 and external object references in external reference container 108. In an embodiment, data cluster container 112, internal reference container 106 and external reference container 108 are stored in memory heap 114.

In an embodiment, external reference container 108 includes translation table 120 typically storing an external map of the external object reference between a data object in a first data cluster to a data object in a second data cluster. The external map generally includes a memory address of the data object in the first data cluster, a memory address of the second cluster and the memory address of the data object in the second data cluster. In an embodiment, internal reference container 106 includes an internal map of an internal object reference between two or more data objects stored in one data cluster. The internal map generally includes memory address of the data objects having internal object references. In an embodiment, cluster management generates a separate internal reference container 106 and external reference container 108 for each data cluster.

Central processing unit 102 typically makes requests for memory access to data clusters stored in data cluster container 112 to cluster management 104. The requests for memory access to data clusters generally include one or more of a read access to the data cluster, a write access to the data cluster, a complete access including read access and write access to the data cluster, following an internal object reference and following an external object reference.

Access management 110 is typically responsible for managing the memory accesses to the data clusters stored in data cluster container 112. A request for the memory access by central processing unit 102 typically includes passing on information of application threads and user context of a current application to access management 110. Access control list 130 typically stores user identifiers of one or more users and one or more permissions of each of the user to access a data cluster. The permissions generally include one both of a write lock and a complete lock.

Upon receiving the request for the memory access to a data cluster from central processing unit 102, access management 104 looks up access control list 130 to determine the permission of the user to access the data cluster. If the user has the permission of write lock, access management 110 locks write access of the user and allows only read access to the data cluster. If the user has the permission of complete lock, access management 110 locks read and write access of the user to the data cluster. Access management 110 typically passes on the permission of the user to cluster management 104. Cluster management 104 is generally responsible for carrying out the actual memory access to the data cluster based upon the permission of the user. In an embodiment access control list 130 is typically generated by access management 110. In an embodiment each data cluster has a separate access control list 130. Access control list 130 may be modified by a system administrator to change the permissions of the user or to add the permissions for new users.

Upon receiving a request for memory access to follow an object reference in the data cluster from central processing unit 102, cluster management 104 determines whether the object reference is an internal object reference or an external object reference. If the object reference is an internal object reference, cluster management retrieves the internal map of the internal object reference from internal reference container 106 and follows the internal map to access a referenced data object in the data cluster. If the object reference is an external object reference to a data object stored in a second data cluster, cluster management retrieves the external map of the object reference from external reference container 108 and follows the external map to access the data object stored in the second data cluster.

In an embodiment cluster management 104 runs a garbage collection in data cluster container 112 based upon the internal object references stored in internal reference container 106 and the external object references stored in external reference container 108.

Figure 2:
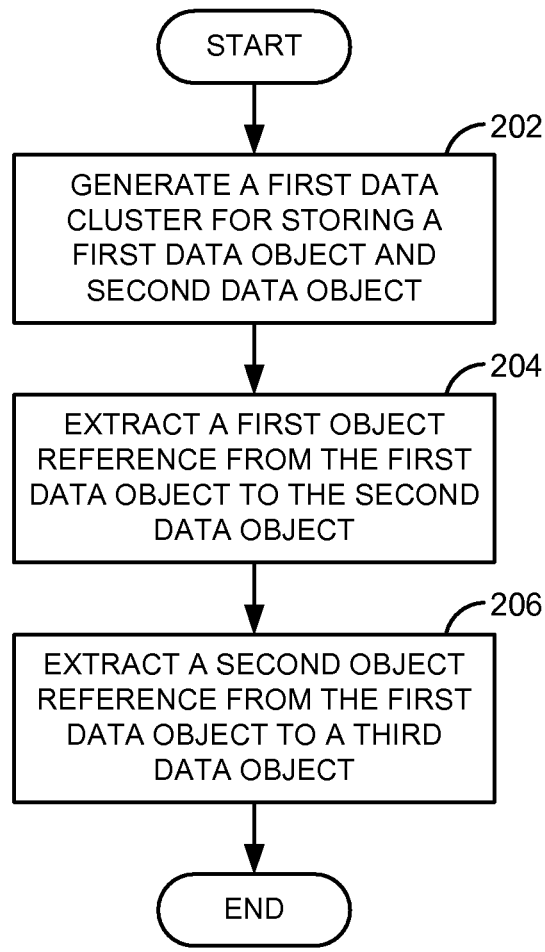
FIG. 2 is a flow diagram of a process for managing data clusters according to an embodiment of the invention.

FIG. 2 is a flow diagram of a process for managing data clusters according to an embodiment of the invention. In process block 202, a first data cluster is generated for storing a first data object and a second data object. The first data cluster typically has a strict hierarchy between the first data object and the second data object without any loops of object references between the first data object and the second data object. The first data object and the second data object are logically related to each other. The first data cluster is typically stored in a data cluster container. In process block 204, a first object reference from the first data object to the second data object is extracted typically from the first data cluster. The first object reference is typically stored in a first reference container. The first reference container typically includes an internal map from the first data object to the second data object. In process block 206, a second object reference from the first data object to a third data object is extracted typically from the first data cluster. The second object reference is generally stored in a second reference container. The third data object is typically stored in a second data cluster. The second reference container generally includes an external map from the first data object to the third data object in the second data cluster.

Figure 3:
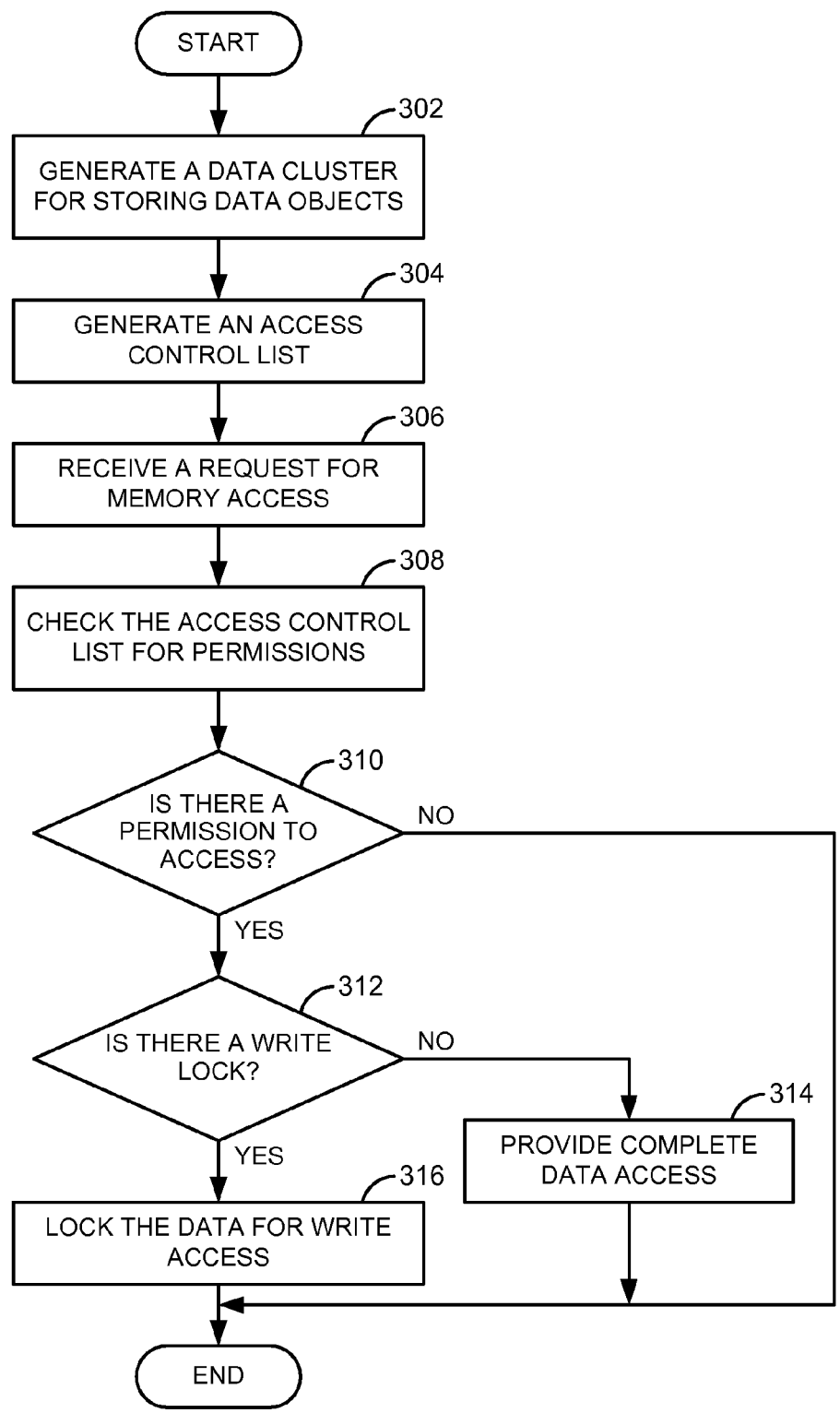
FIG. 3 is a flow diagram of a process for managing data clusters according to an embodiment of the invention.

FIG. 3 is a flow diagram of a process for managing data clusters according to an embodiment of the invention. In process block 302, a data cluster is generated for storing one or more data objects. The data cluster generally includes one or more data objects logically related to each other. The data objects in the data cluster typically maintain a strict hierarchy without any loops of object references between the data objects. A node in the strict hierarchy typically includes one data object. The data cluster is typically stored in a data cluster container. In process block 304, an access control list is generated typically by an access manager. The access control list typically stores user identifiers of one or more users and one or more permissions of each user to access the data cluster. The permissions generally include one both of a write lock and a complete lock. In process block 306, a request for memory access is received typically from a central processing unit. The access manager is typically responsible for managing memory accesses to the data cluster stored in the data cluster container. A request for the memory access typically includes passing on information of application threads and a user context of a current application to the access manager.

In process block 308, the access control list is checked typically by the access manager for determining the permission of the user to access the data cluster. In decision block 310 if the user does not have the permission for memory access to the data cluster, the process is terminated. The user typically does not have the permission for memory access to the data cluster if the user identifier of the user is not listed in the access control list. In decision block 310, if the user has the permission for memory access to the data cluster, the process proceeds to decision block 312. In decision block 312, if the user does not have a permission of write lock, the process proceeds to process block 314 where complete memory access is given to the user. The complete memory access typically includes a write access and a read access. In decision block 312, if the user has a permission of write lock, the process proceeds to process block 316 where the write access of the user to the data cluster is locked and only read access to the data cluster is provided.

Figure 4:
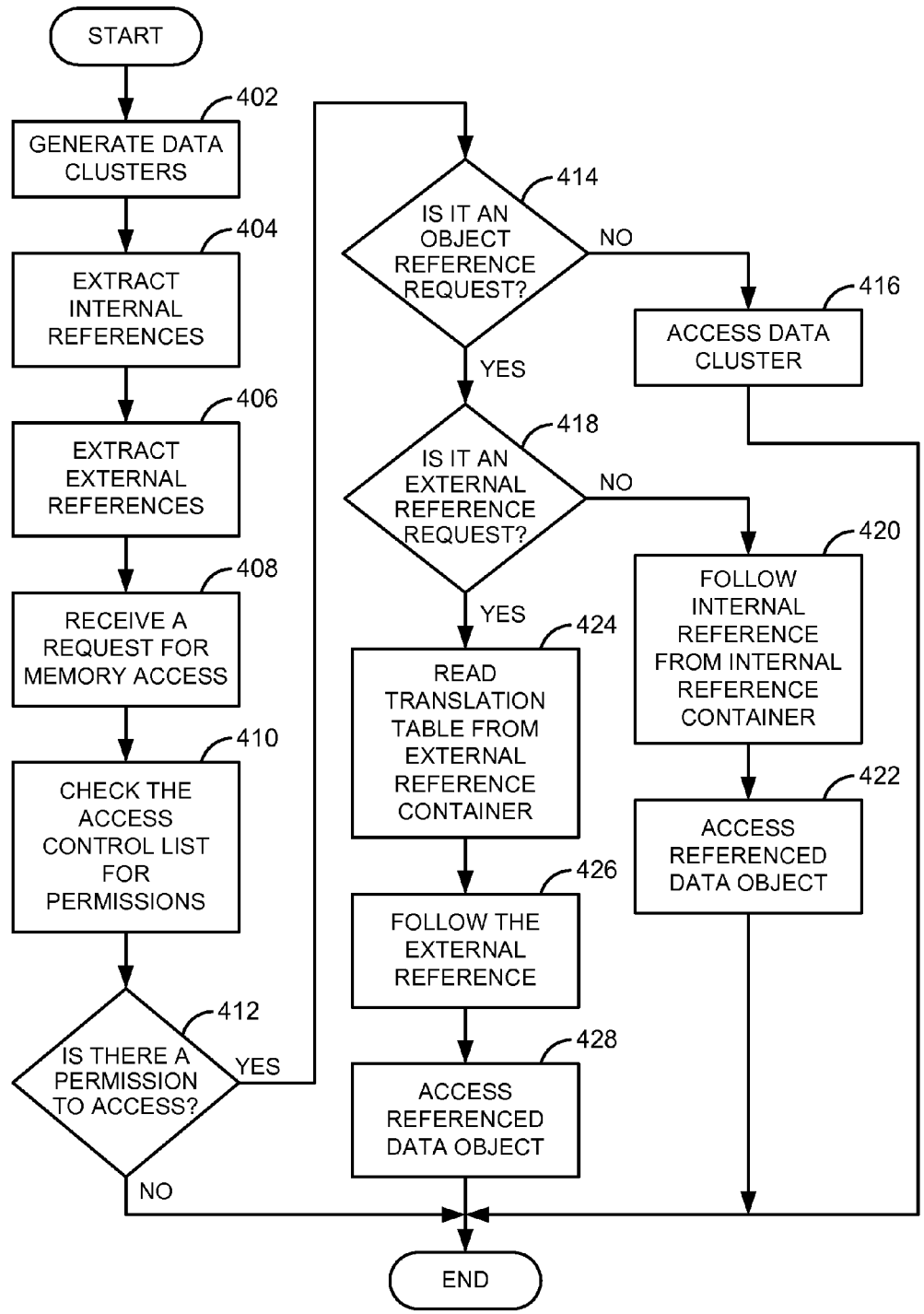
FIG. 4 is a flow diagram of a process for managing data clusters according to an embodiment of the invention.

FIG. 4 is a flow diagram of a process for managing data clusters according to an embodiment of the invention. In process block 402, one or more data clusters are generated and stored in a data cluster container. Each of the data clusters generally includes one or more data objects logically related to each other and the data objects with object references to each other are stored in a single data cluster. The data objects in each of the data clusters typically maintain a strict hierarchy without any loops of object references between the data objects. A node in the strict hierarchy typically includes one data object. In process block 404, one or more internal object references existing between data objects that are stored in one data cluster are extracted from the data clusters. The internal object references are typically stored in an internal reference store. In an embodiment the internal reference container includes an internal map of an internal object reference between two or more data objects stored in one data cluster. The internal map generally includes memory address of the data objects having internal object references. In process block 406, one or more external object references existing between the data objects stored in separate data clusters are extracted from the data clusters. The external object references are typically stored in an external reference store. In an embodiment, the external reference container includes a translation table typically storing an external map of the external object reference between a data object in a first data cluster to a data object in a second data cluster. The external map generally includes a memory address of the data object in the first data cluster, a memory address of the second cluster and the memory address of the data object in the second cluster.

In process block 408 a request for memory access to a data cluster is received. An access manager is typically responsible for managing memory accesses to the data clusters stored in the data cluster container. The request for memory access to the data clusters may include one or more of a read access to the data cluster, a write access to the data cluster, a complete access including read access and write access to the data cluster, following an internal object reference and following an external reference. The request for the memory access typically includes passing on information of application threads and a user context of a current application to the access manager.

In process block 410, an access control list is checked typically by the access manager for determining the permission of a user to access the data cluster. The access control list is generated typically by the access manager. The access control list typically stores user identifiers of one or more users and one or more permissions of each user to access the data cluster. The permissions generally include one both of a write lock and a complete lock. In decision block 412, if the user does not have the permission for memory access to the data cluster, the process is terminated. The user typically does not have the permission for memory access to the data cluster if the user identifier of the user is not listed in the access control list. In decision block 412, if the user has the permission for memory access to the data cluster, the process proceeds to decision block 414.

In decision block 414, if the request for memory access is not an object reference request, the process proceeds to process block 416 where the data cluster is accessed and the operation requested by the user is performed. In decision block 414, if the request for memory access is an object reference request, the process proceeds to decision block 418. In decision block 418, if the object reference request is not an external reference request, the process proceeds to process block 420 where the internal reference from the internal reference container is followed. In process bock 422, a referenced data object in the data cluster is accessed and the operation requested by the user is performed. In decision block 418, if the object reference request is an external reference request, the process proceeds to process block 424. In process block 424, the translation table is read from the external reference container. In process block 426 the external reference is followed to a referenced data object stored in a second data cluster. In process block 428, the referenced data object in the second cluster is accessed and the operation requested by the user is performed.

Figure 5:
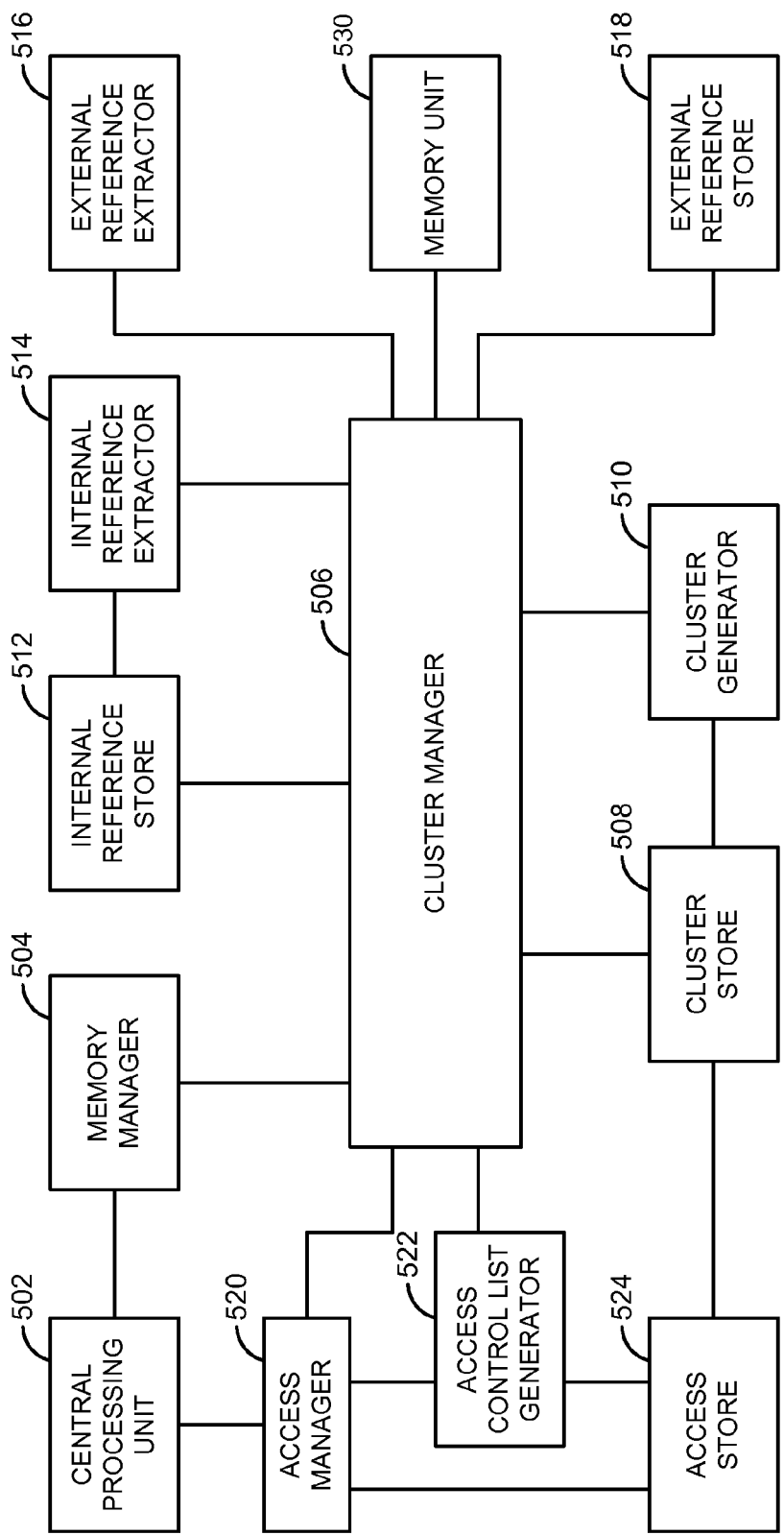
FIG. 5 is a block diagram of a system for managing data clusters useful for implementing the invention according to an embodiment of the invention.

FIG. 5 is a block diagram of a system for managing data clusters useful for implementing the invention according to an embodiment of the invention.

Memory manager 504 is typically responsible for receiving requests for memory access to memory unit 530 from central processing unit 502, retrieving and returning a required data to central processing unit 502.

Cluster generator 510 is generally responsible for generating one or more data clusters and storing the data clusters in cluster store 508. The requests for memory access to memory unit 530 are typically forwarded to cluster manager 506. It is the responsibility of cluster manager 506 to carry out the memory access requested by central processing unit 502 and return the required data to memory manager 504. Memory manager generally received the requested data from cluster manager 506 and forwards the requested data to central processing unit 502. Cluster manager 506 typically identifies the data cluster needed for carrying out the memory access and loads the data cluster in to memory unit 530 if the data cluster is not already present in memory unit 530. In an embodiment cluster manager 506 carries out the memory access to the data cluster in memory unit 530. Each of the data clusters generally includes one or more data objects logically related to each other. The data objects with object references to each other are generally stored in a single data cluster. The data objects in each of the data clusters typically maintain a strict hierarchy without any loops of object references between the data objects. Each node in the strict hierarchy typically includes one data object. A data size of the data clusters may typically be changed dynamically by cluster manager 506 based on the number of data objects logically related to each other. Internal reference store 512 generally stores internal object references between the data objects that are stored in one data cluster. Object references may exist between data objects that are stored in separate data clusters. Such object references are stored as external object references in external reference store 518. In an embodiment, internal reference extractor 514 is responsible for extracting internal object references from the data clusters and storing the internal object references in internal reference store 512. External reference extractor 516 is responsible for extracting external object references from the data clusters and storing the external object references in external reference store 518.

In an embodiment, external reference store 518 includes a translation table typically storing an external map of the external object reference between a data object in one data cluster to a data object in a second cluster. The external map generally includes a memory address of the data object in the first data cluster, a memory address of the second cluster and the memory address of the data object in the second cluster. In an embodiment internal reference store 512 includes an internal map of an internal object reference between two or more data objects stored in one data cluster. The internal map generally includes memory address of the data objects having internal object references.

In an embodiment the requests for memory access to the data clusters generally include one or more of a read access to the data cluster, a write access to the data cluster, a complete access including read access and write access to the data cluster, following an internal object reference and following an external reference.

Access manager 520 is typically responsible for managing memory accesses to the data clusters. A request for the memory access by central processing unit 502 typically includes passing on information of application threads and user context of a current application to access manager 520. Access store 524 typically stores an access control list having user identifiers of one or more users and one or more permissions of each user to access the data clusters. The permissions generally include one or both of a write lock and a complete lock. In an embodiment the access control list is generated and stored in access store 524 by access control list generator 522. In an embodiment each data cluster has one access control list stored in access store 524.

Upon receiving the request for the memory access to a data cluster from central processing unit 502, access manager 520 looks up the access control list in access store 524 to determine the permission of the user to access the data cluster. If the user has the permission of write lock, access manager 520 locks write access of the user and allows only read access to the data cluster. If the user has the permission of complete lock, access manager 520 locks read and write access of the user to the data cluster. Access manager 520 typically passes on the permission of the user to cluster manager 506. Cluster manager 506 is generally responsible for carrying out the actual memory access to the data cluster based upon the permission of the user. The access control list may be modified by a system administrator to change the permissions of the user or to add the permissions for new users.

Upon receiving a request for memory access to follow an object reference in the data cluster from central processing unit 502, cluster manager 506 determines whether the object reference is an internal object reference or an external object reference. If the object reference is an internal object reference, cluster manager 506 retrieves the internal map of the internal object reference from internal reference store 512 and follows the internal map to access a referenced data object in the data cluster. If the object reference is the external object reference to a data object stored in a second data cluster, cluster management retrieves the external map of the object reference from external reference store 518 and follows the external map to access the data object stored in the second data cluster.

In an embodiment cluster manager 506 runs a garbage collection in memory unit 530 based upon the internal object references stored in internal reference store 512 and the external object references stored in external reference store 518.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

What is claimed is:

1. A computer implemented method to provide an access to an object stored in a memory, comprising:
   identifying a plurality of data objects in a strict hierarchy including object references without a loop between the plurality of data objects;
   based on the identification, generating a first data cluster including a first data object and a second data object from the plurality of data objects, the first data object logically related to the second data object in the first data cluster;
   extracting, by a processor of the computer, a first object reference from the first data object to the second data object;
   storing, in a memory of the computer, the first object reference in a first reference container;
   extracting, by the processor, a second object reference from the first data object to a third data object, the third data object stored in a second data cluster;
   storing, in the memory, the second object reference in a second reference container;
   upon receiving a request to follow an object reference, comparing the object reference with the first object reference and the second object reference to:
      follow the first object reference, when the requested object reference corresponds to the first object reference; and
      follow the second object reference, when the requested object reference corresponds to the second object reference; and
   based on the comparison, providing an access to an object by following the requested object reference, in the memory.

2. The computer implemented method of claim 1, further comprising:
   generating an access control list associated with the first data cluster; and
   providing the memory access to the first data cluster based upon the access control list.

3. The computer implemented method of claim 2, wherein generating the access control list comprises: generating one or more permissions for the memory access to the first data cluster.

4. The computer implemented method of claim 3, wherein the one or more permissions is selected from a group consisting of a write lock and a complete lock.

5. The computer implemented method of claim 1, further comprising: performing a garbage collection in the first data cluster using the first reference container and the second reference container.

6. The computer implemented method of claim 1, further comprising: storing a translation table in the second reference container.

7. The computer implemented method of claim 6, wherein storing the translation table comprises: storing a map of the second object reference between the first data object and the third data object, the map including an address of the first data object, an address of the second data cluster and an address of the third data object in the second data cluster.

8. The computer implemented method of claim 1, wherein following the second object reference further comprises: loading the second data cluster in to a memory.

9. The computer implemented method of claim 8, wherein the memory comprises a random access memory.

10. A computer system to provide an access to an object in a memory, comprising:
    a processor; and
    a memory coupled to the processor to store program code, the program code comprising:
       a cluster generator:
          to identify a plurality of data objects in a strict hierarchy including object references without a loop between the plurality of data objects; and
          to generate a first data cluster based on the identification, the first data cluster including a first data object and a second data object from the plurality of data objects, wherein the first data object logically related to the second data object in the first data cluster;
       an internal reference extractor to extract a first object reference from the first data object to the second data object;
       an internal reference store communicatively coupled to the internal reference extractor to store the first object reference;
       an external reference extractor to extract a second object reference from the first data object to a third data object, the third data object stored in a second data cluster;
       an external reference store communicatively coupled to the external reference extractor to store the second object reference; and
       a cluster manager communicatively coupled to the cluster generator and configured to:
          upon receiving a request to follow an object reference, compare the object reference with the first object reference and the second object reference to:
             follow the first object reference, when the requested object reference corresponds to the first object reference; and
             follow the second object reference, when the requested object reference corresponds to the second object reference;
          based on the comparison, provide an access to an object by following the requested object reference, in the memory.

11. The computer system of claim 10, further comprising:
    an access control list generator communicatively coupled to the cluster manager to generate an access control list for the first data cluster; and
    an access manager communicatively coupled to the cluster manager and the access control list generator to provide the memory access to the first data cluster based upon the access control list.

12. The computer system of claim 10, further comprising: a garbage collector communicatively coupled to the cluster manager, the internal reference store and the external reference store to perform a garbage collection in the first data cluster and the second data cluster.

13. A non-transitory computer readable medium storing instructions, which when executed by a computer, cause the computer to perform operations, comprising:
    identify a plurality of data objects in a strict hierarchy including object references between the plurality of data objects;
    based on the identification, generate a first data cluster including a first data object and a second data object, the first data object logically related to the second data object in the first data cluster;
    extract a first object reference from the first data object to the second data object;

store the first object reference in a first reference container;

extract a second object reference from the first data object to a third data object, the third data object stored in a second data cluster;

store the second object reference in a second reference container;

upon receiving a request to follow an object reference, comparing the object reference with the first object reference and the second object reference to:

follow the first object reference, when the requested object reference corresponds to the first object reference; and follow the second object reference, when the requested object reference corresponds to the second object reference;

based on the comparison, provide an access to an object by following the requested object reference, in the memory.

14. The non-transitory computer readable medium of claim 13, further storing instructions, which when executed by the computer cause the computer to perform operations, comprising:

generating an access control list associated with the first data cluster; and providing the memory access to the first data cluster based upon the access control list.

15. The non-transitory computer readable medium of claim 14, wherein generating the access control list comprises: generating one or more permissions for the memory access to the first data cluster.

16. The non-transitory computer readable medium of claim 13, further storing instructions, which when executed by the computer cause the computer to perform operations, comprising performing a garbage collection in the first data cluster using the first reference container and the second reference container.

17. The non-transitory computer readable medium of claim 13, further storing instructions, which when executed by the computer cause the computer to perform operations, comprising: storing a translation table in the second reference container 18. The non-transitory computer readable medium of claim 17, wherein storing the translation table comprises: storing a map of the second object reference between the first data object and the third data object, the map including an address of the first data object, an address of the second data cluster and an address of the third data object in the second data cluster.

* * * * *